United States Patent
Martin

[11] Patent Number: 5,947,641
[45] Date of Patent: Sep. 7, 1999

[54] MARINE PIPELAYING

[75] Inventor: Robert George Martin, Oldmeldrum, United Kingdom

[73] Assignee: Coflexip Stena Offshore Limited, United Kingdom

[21] Appl. No.: 08/817,782

[22] PCT Filed: Oct. 12, 1995

[86] PCT No.: PCT/GB95/02411

§ 371 Date: Jul. 2, 1997

§ 102(e) Date: Jul. 2, 1997

[87] PCT Pub. No.: WO96/12907

PCT Pub. Date: May 2, 1996

[30] Foreign Application Priority Data

Oct. 21, 1994 [GB] United Kingdom .................. 9421262

[51] Int. Cl.⁶ .......................................................... F16L 1/04
[52] U.S. Cl. ...................... 405/168.1; 226/168; 254/407; 405/158
[58] Field of Search ................ 405/168.1–168.4; 242/602.1, 602.2, 602; 226/168; 254/407

[56] References Cited

U.S. PATENT DOCUMENTS 5,348,423  9/1994  Maloberti et al. ............... 405/168.4 X
5,692,859  12/1997  Dickson et al. .................... 405/168.4

*Primary Examiner*—Dennis L. Taylor
*Attorney, Agent, or Firm*—Ostrolenk, Faber, Gerb & Soffen, LLP

[57] ABSTRACT

Method and apparatus for preventing the buckling of a pipeline (10) on either side of a localised zone of increased stiffness in the pipeline (such as a buckle arrester (12)) when the pipeline is bent around an arcuate path, in which packing elements (14) are located between the pipeline and a pipeline bearing surface (20) defining the arcuate pipeline path on either side of the zone of increased stiffness so as to vary the radius of curvature of the pipeline between a first, greatest value adjacent the zone of increased stiffness, and a second smaller value substantially equal to the radius of curvature of the arcuate pipeline path at a predetermined distance from the zone of increased stiffness on either side thereof. The packing elements (14) comprise a graded series of blocks adapted to be attached to the pipeline on either side of the zone of increased thickness. The blocks may be shaped as required to cooperate with the pipeline and the pipeline bearing surface.

16 Claims, 1 Drawing Sheet

MARINE PIPELAYING

The present invention relates to improvements in marine pipelaying methods and apparatus of the type in which a rigid pipeline is bent around an arcuate path at some stage in the pipelaying process. It is particularly concerned with avoiding damage to the pipe caused by zones of differing stiffness within the pipeline being bent around such an arcuate path.

Certain types of marine pipelaying operations involve the pipe being bent around an arcuate path, the pipeline often being subject to plastic deformation during such bending and subsequent straightening in the course of the laying operation. Such bending occurs both in pipeline systems where a continuous length of pipeline is assembled onshore and is spooled onto a reel, the pipe being unspooled from the reel and straightened as it is laid from the lay vessel, and in a variation of "stovepipe" operations in which joints of pipe are assembled into a continuous pipe on board the vessel and in which the assembled pipe is plastically bent around an arcuate path and subsequently straightened in order to achieve a desired launch angle of the pipe from the vessel.

The pipeline may include zones of differing stiffness. For example, the pipeline may include "buckle arresters" at periodic intervals. Buckle arresters comprise short lengths of pipe having greater wall thickness and greater outside diameter than the main body of the pipeline, and are incorporated into the pipeline at intervals to arrest the propagation of buckles in the pipeline which may occur if the pipeline tension is not correctly controlled during laying. Such buckle arresters constitute zones of increased stiffness in the length of the pipeline.

It has not hitherto been possible to pass buckle arresters around arcuate paths in the types of pipelaying system referred to above. When the pipe is bent around an arcuate pipe bearing surface defining an arcuate path, such as a reel or an arcuate diverter structure, the pipe will tend to hinge on either side of the zone of increased stiffness. This situation is worsened when the zone of increased stiffness also has an increased outside diameter.

It is an object of the present invention to provide a method and apparatus whereby a pipeline incorporating zones of differing stiffness can be bent around an arcuate path without damage to the pipeline adjacent such zones.

In accordance with a first aspect of the invention there is provided a method of bending a pipeline around an arcuate pipeline bearing surface defining an arcuate pipeline path, said pipeline having a main body of substantially uniform longitudinal stiffness and including one or more localised zones wherein the longitudinal stiffness is greater than that of the main body of the pipeline comprising varying the radius of curvature of the pipeline as it passes around said arcuate path over a predetermined distance along the pipeline on either side of said localised zone of increased stiffness, said radius of curvature being varied between a first value adjacent said zone which is greater than the radius of curvature of the arcuate path and a second value at the end of said predetermined distance which is substantially equal to the radius of curvature of the arcuate path, so as to prevent hinging of the pipeline on either side of said localised zone of increased stiffness.

Preferably, said first value of said radius of curvature and said predetermined distance are dependent upon the relative stiffnesses of the main body of the pipeline and of said localised zone and on the radius of curvature of the arcuate path.

Preferably, said radius of curvature is varied by the introduction of packing elements between the pipeline and the arcuate pipe bearing surface on either side of said zone.

Preferably also, said packing elements are attached to the pipeline prior to the pipeline passing around said arcuate path.

Most preferably, said packing elements each comprise a graded series of discrete elements adapted to be attached to the pipeline at intervals along said predetermined distances on either side of said zone.

In accordance with a second aspect of the invention there is provided packing means for use in performing the method in accordance with the method of the first aspect of the invention, said packing means comprising a graded series of discrete packing elements adapted to be attached to the pipeline at intervals along said predetermined distances on either side of said zone.

Preferably, each discrete element has a first surface adapted to be seated against the surface of the pipeline and a second surface adapted to be seated against the pipe bearing surface defining said arcuate path, said first and second surfaces being spaced apart by a distance which varies between a first, greatest distance in a first element of said graded series and a second, smallest distance in a final element of said graded series. The distance between said first and second surfaces may also vary along the length of each of said discrete elements.

Embodiments of the invention will now be described, by way of example only, with reference to the accompanying drawings in which.

Figure 1:
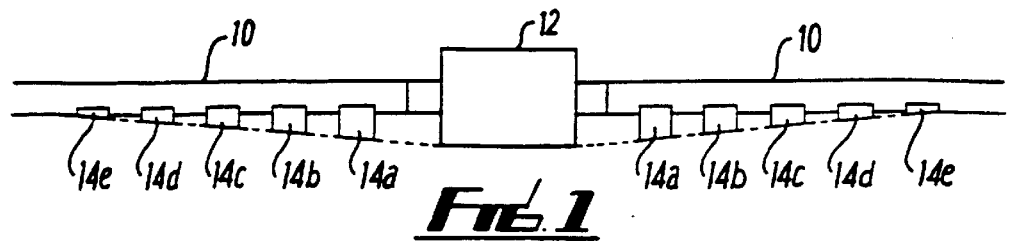
FIG. 1 is a schematic side view of a length of pipeline incorporating a buckle arrester and having packing elements applied thereto in accordance with the invention.
Figures 2, 3A, 3B, 3C:
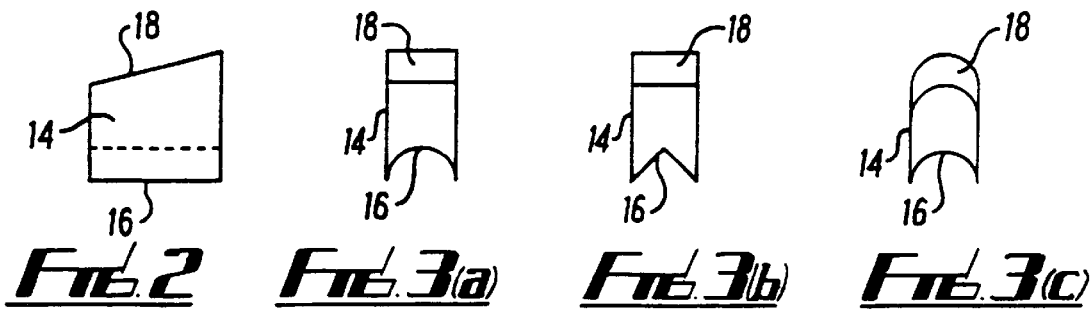
FIG. 2 is a schematic side view of one of the packing elements of FIG. 1.
Figure 4:
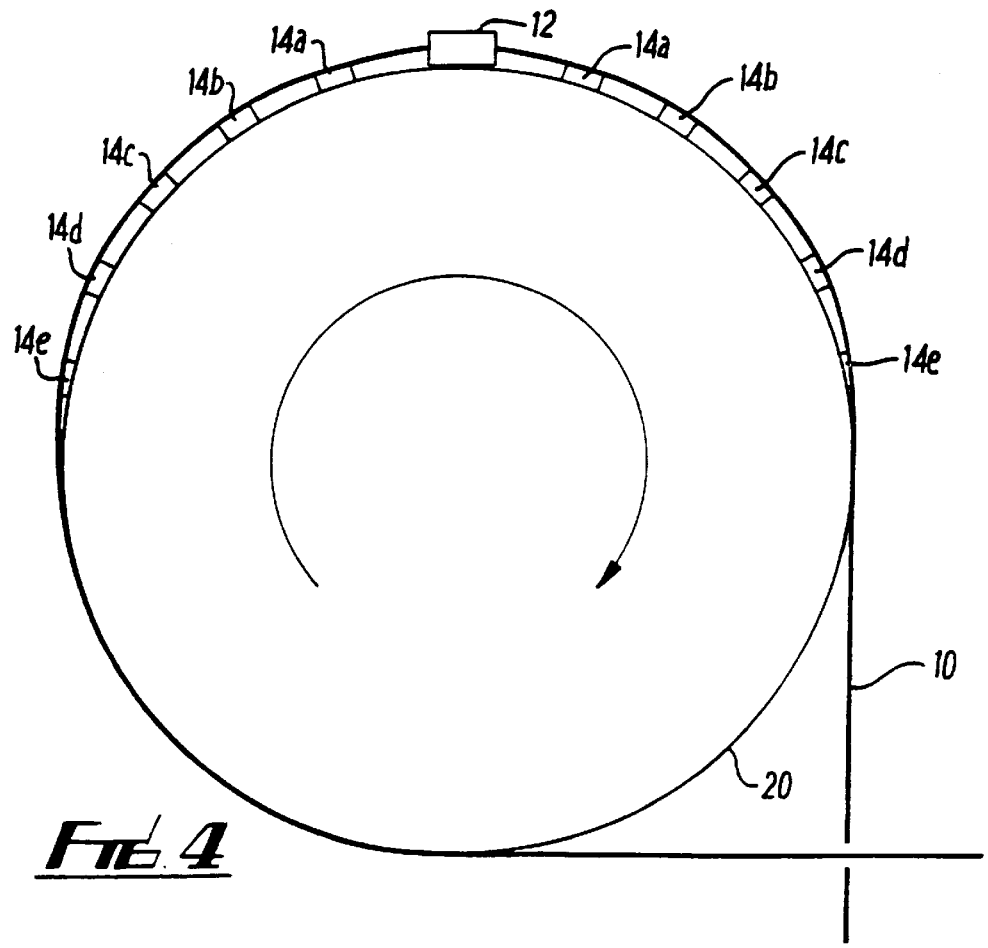

FIGS. 3(a), (b) and (c) are schematic end views of variations of the packing element of FIG. 2; and FIG. 4 is a schematic side view of the pipeline of FIG. 1 being bent around an arcuate pipeline diverter sheave.

FIG. 1 shows a portion of a pipeline 10 having a buckle arrester 12 incorporated therein. The buckle arrester 12 constitutes a localised zone of the pipeline having a stiffness greater than the substantially uniform stiffness of the main body of the pipeline 10 on either side thereof. The arrester 12 also has an outside diameter greater than that of the pipeline 10. It should be noted that the relative diameters of the pipeline and arrester are greatly exaggerated in the drawing. In practice, for example, a 16 inch (40.64 cm) diameter pipe would employ buckle arresters having a diameter 2–3 inches (5.08–7.62 cm) greater than the pipe.

If the pipeline of FIG. 1 were to be bent around an arcuate path, the pipe would tend to hinge on either side of the buckle arrester 12 because of the dissimilar stiffnesses. In order to avoid such hinging, in accordance with the invention, packing elements 14a to 14e are attached to that side of the pipe which will contact a pipe bearing surface defining an arcuate path, over a predetermined distance along the pipeline 10 on either side of the buckle arrester 12.

The packing elements 14a to 14e comprise a graded series of discrete elements each of which have a first surface 16 (FIGS. 2 and 3) adapted to be seated against the surface of the pipe, and a second surface 18 adapted to be seated against the pipe bearing surface defining the arcuate pipeline path. The first and second surfaces 16, 18 are spaced apart by a distance which varies between a first, greatest distance for the elements 14a adjacent the arrester 12 and a second, smallest distance for the elements 14e furthest from the arrester 12.

When the pipeline 10 is bent around an arcuate bearing surface, such as a circular pipe diverter sheave 20 as shown in FIG. 4, the packing elements 14 have the effect of varying the radius of curvature between a first, maximum value adjacent the arrester 12 and a second value substantially equal to the radius of curvature of the arcuate path at a predetermined distance along the pipe on either side of the arrester 12.

The initial maximum value of the radius is determined by the relative stiffnesses and/or diameters of the pipeline 10 and the arrester 12 and the radius of curvature of the arcuate path. The variation of the radius of curvature preferably extends over about 90 degrees of arc on either side of the arrester. The dimensions, number and spacings of the packing elements are selected to suit the required variation of radius of curvature and the distance over which such variation extends.

The relative dimensions of the pipeline 10, arrester 12 and sheave 20 are again exaggerated in FIG. 4. As noted above, the diameter of the arrester 10 is likely to be about 10 to 20 percent greater than that of the pipeline 10, and the sheave is likely to have a diameter of about 12 metres for a 16 inch pipeline. The numbers and the relative sizes and spacings of packing elements shown in the drawings have been selected purely for convenience of illustration and are not intended to be directly representative of actual numbers, sizings and spacings as used in practice, which will be determined by the geometry of the pipeline path and by the parameters of the pipeline and buckle arresters.

Referring again to FIGS. 2 and 3, it will be seen that the distance between the first and second surfaces 16, 18 is shown as varying along the length of the element 14. In practice, the variation in the radius of curvature between the ends of a single packing element is likely to be negligible, so that such variation in thickness along the length of the element will similarly be negligible and may be disregarded; ie the elements might suitably be of uniform thickness along their lengths. Similarly, the elements might be curved along their lengths to match the curvature of the pipeline and the arcuate path. However, such curvature is again likely to be so small along the length of the individual elements as to be negligible.

The pipe contacting surface 16 of the element is preferably concave or V-shaped as shown to suit the diameter of the pipe. The opposite surface 18 can be shaped to suit the configuration of the pipe bearing surface defining the arcuate path or to mimic the shape of the pipe (as in FIG. 3(c)).

The elements can be secured to the pipe by any suitable means (not shown), such as straps or the like, and are preferably removed after the pipeline departs from the arcuate path. The individual packing elements might also be flexibly connected together at the required spacings by any suitable means (not shown). The elements are formed from any suitable material having the required rigidity and compressive strength, such as polyurethane.

Improvements and modifications may be incorporated without departing from the scope of the invention.

I claim:

1. A method of bending a hollow pipeline around an arcuate, pipeline bearing surface defining an arcuate pipeline path while preventing the pipeline from hinging on each side of localized zone of the pipeline, the method comprising:

providing a hollow pipeline having a main body of substantially uniform longitudinal stiffness and the main body having at least one localized zone with a longitudinal stiffness greater than that of the remainder of main body and the zone being located along the length of the main body, passing the hollow pipeline including the localized zone around the arcuate pipeline path; and gradually varying a radius of curvature around the arcuate pipeline path of a respective section of the main body on each side of the localized zone, such that the radius of curvature of the pipeline in each section on each side of the localized zone decreases in a graded manner from a first radius at a location in the section adjacent the localized zone and which is greater than a radius of curvature of the arcuate pipeline path to a second radius at a location in the section remote from the localized zone and the second radius being substantially equal to the radius of curvature of the arcuate pipeline path, so as to prevent hinging of the pipeline in the sections on each side of the localized zone.

2. The method according to claim 1, wherein varying the radius of curvature of the section comprises selecting the first radius and the length of the section in accordance with the stiffness of the main body of the pipeline relative to the stiffness of the localized zone and with the radius of curvature of the arcuate pipeline path so as to prevent the main body sections from hinging.

3. The method according to claim 1, wherein the length of each section corresponds to an arc extending about around the pipeline bearing surface.

4. The method according to claim 1, wherein the stop of varying the radius of curvature of the section of the main body of the pipeline includes providing a first graded set of packing elements and a second graded set of packing elements; each of the packing elements has a first surface adapted to be seated against the pipeline, a second surface adapted to be seated against the pipeline bearing surface, and a height defined between the respective first and second surfaces; the packing elements of each set have different heights which gradually decrease from one of the packing elements having a greatest height to another of the packing elements having a shortest height;

placing the packing elements of the first set at a first one of the pipeline sections such that the greatest height packing element is nearest to the localized zone and placing the other ones of the packing elements of successively shorter height in the first set at spaced apart intervals along the first section successively further from the localized zone; and placing the packing elements of the second set at a second one of the pipeline sections such that the greatest height packing element is nearest to the localized zone and placing the other ones of the remaining packing elements of successively shorter height in the second set at spaced apart intervals along the second section successively further from the localized zone.

5. The method according to claim 4, wherein the packing elements are placed between the pipeline and the pipeline bearing surface after the pipeline has been passed around the arcuate pipeline path.

6. The method according to claim 4, wherein the placing of the packing elements comprises fastening the packing elements to the pipeline prior to passing the pipeline around the pipeline bearing surface.

7. A combination to prevent hinging of a pipeline when the pipeline is passed around an arcuate pipeline bearing surface, the combination comprising:

a hollow pipeline having a main body of substantially uniform longitudinal stiffness and the main body having at least one localized zone of increased longitudinal stiffness relative to the main body, and the zone being located along the length of the main body such that the pipeline main body has a first section at one side of the zone along the length of the main body and a second section of the opposite side of the zone along the length of the main body;

an arcuate, pipeline bearing surface; and a first graded set of a plurality of packing elements to be placed between the first section of the main body of the pipeline and the pipeline bearing surface and a second graded set of a plurality of packing elements to be placed between the second section of the main body of the pipeline and the pipeline bearing surface;

each of the packing elements having a first surface adapted to be seated against the pipeline, and a second surface adapted to be seated against the arcuate pipeline bearing surface, and a height between the first and second surfaces; the packing elements of each set have different heights which gradually decrease from one of the packing elements having a greatest height to another of the packing elements having a shortest height, wherein the packing elements of the first and second sets are respectively disposed at the first and second sections of the main body of the pipeline such that the packing element in each set having the greatest height is disposed nearest to the localized zone and the remaining packing elements in the set are successively disposed along the respective section of the pipeline main body at spaced apart intervals located successively further from the localized zone in decreasing order of height for gradually decreasing the radius of curvature of the pipeline main body from greater than the radius of the arcuate, pipeline bearing surface at the localized zone to substantially equal to the radius of the arcuate, pipeline bearing surface.

8. The combination according to claim 4, wherein the height of each packing element in each set varies along the length of the packing element.

9. The combination according to claim 4, wherein the first surface of each packing element is generally concave in cross-section.

10. The combination according to claim 9, wherein the first surface of each packing element is V-shaped in cross-section.

11. The combination according to claim 9, wherein the first surface of each packing element has a contour adapted to conform to the contour of the respective section of the pipeline main body.

12. The combination according to claims 7, wherein the second surface of each packing element has a contour adapted to conform to the pipeline bearing surface.

13. The combination according to claim 4, wherein the second surface of each packing element has a contour adapted to match the contour of the respective section of the pipeline main body.

14. The combination according to claim 4, further comprises a strap for each of the packing elements for securing the packing element on the pipeline.

15. The combination according to claim 4, further comprising a flexible connector between adjacent ones of the plurality of packing elements for connecting the packing elements and for accommodating an interval of space between successive packing elements.

16. The combination according to claim 4, wherein the packing elements are comprised of polyurethane.

\* \* \* \* \*